United States Patent
Tillenburg

(10) Patent No.: US 6,804,097 B1
(45) Date of Patent: Oct. 12, 2004

(54) PROTECTIVE CIRCUIT FOR ELECTRONIC MODULES, ESPECIALLY DRIVER MODULES

(75) Inventor: Dirk Tillenburg, Wohnsitz, D-50997 Köln (DE)

(73) Assignee: Dirk Tillenburg, Cologne (DE)

( * ) Notice: Subject to any disclaimer, the term of this patent is extended or adjusted under 35 U.S.C. 154(b) by 0 days.

(21) Appl. No.: 09/719,466

(22) PCT Filed: Mar. 24, 2000

(86) PCT No.: PCT/EP00/02612

§ 371 (c)(1),
(2), (4) Date: Dec. 12, 2000

(87) PCT Pub. No.: WO00/62395

PCT Pub. Date: Oct. 19, 2000

(30) Foreign Application Priority Data

Apr. 12, 1999 (DE) .......................... 199 16 321

(51) Int. Cl.[7] ............................................... H02H 3/18
(52) U.S. Cl. ...................... 361/84; 361/111; 307/127
(58) Field of Search .............................. 361/18, 82, 84, 361/88, 91.5, 110, 111; 307/127

(56) References Cited

U.S. PATENT DOCUMENTS

| 3,675,141 A | * | 7/1972 | Adams | 330/263 |
| 5,410,441 A | | 4/1995 | Allman | 361/18 |
| 5,805,396 A | | 9/1998 | Sado et al. | 361/42 |

FOREIGN PATENT DOCUMENTS

| DE | 19640272 | 7/1998 | H01L/23/62 |

* cited by examiner

Primary Examiner—Ronald W. Leja
(74) Attorney, Agent, or Firm—Horst M. Kasper

(57) ABSTRACT

The invention relates to a protective circuit for electronic modules, especially driver modules, for protecting against polarity reversal and against rupturing of the neutral conductor. A first protective diode (D1) is arranged, with the cathode thereof, in the supply lead (3) such that it leads to the t supply potential (GND). Said supply lead is supplied by the lower-lying supply potential (GND) and is provided for the circuit parts (A1) connected in incoming circuit from the module (B1). A second protective diode (D2) is arranged, with the diode thereof, in the supply terminal (4) of the module (B1) such that it leads to the supply potential (GND), said supply terminal being supplied by the lower-lying supply potential (GND).

Figure 1:
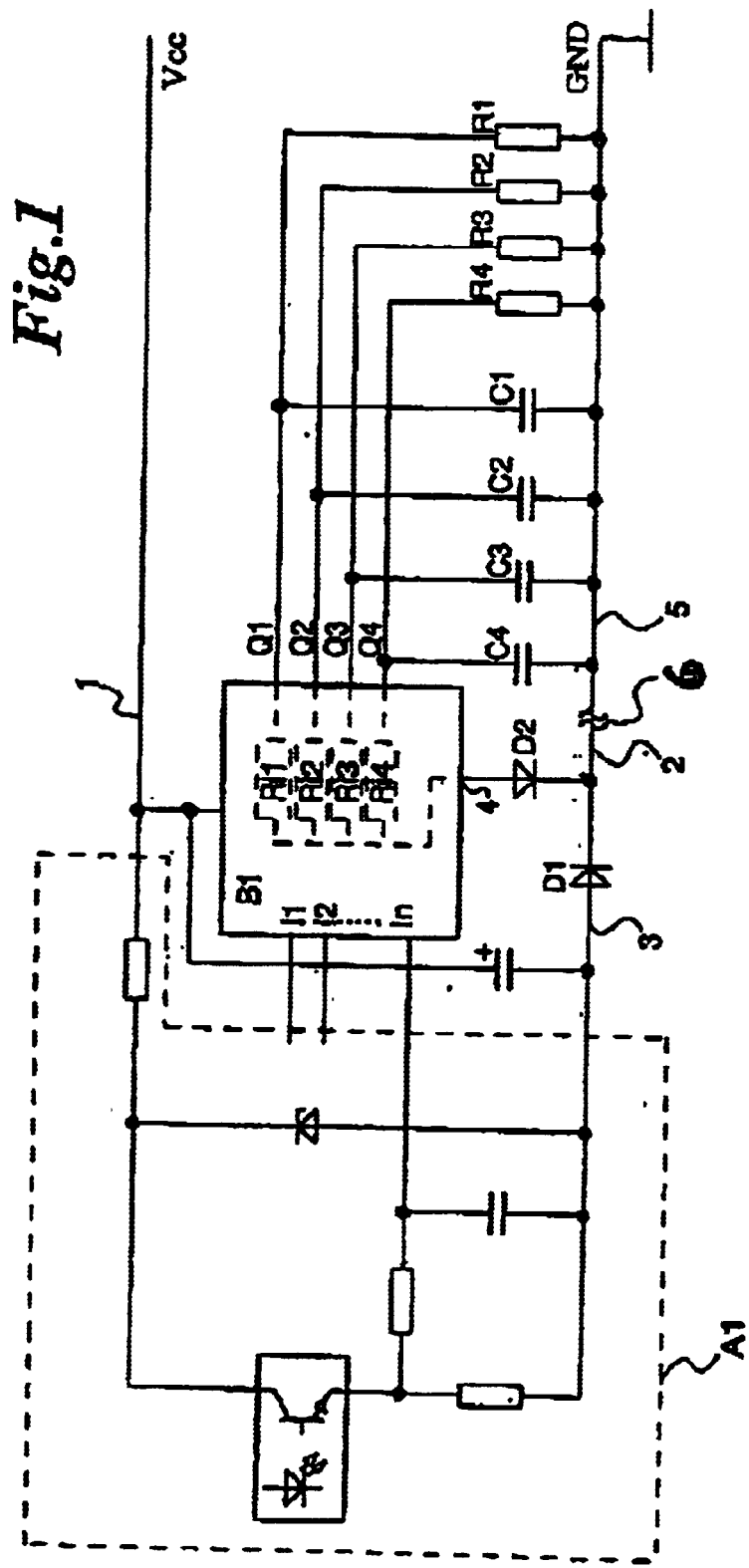

11 Claims, 2 Drawing Sheets

PROTECTIVE CIRCUIT FOR ELECTRONIC MODULES, ESPECIALLY DRIVER MODULES

TECHNICAL FIELD

The invention relates to a protective circuit for electronic modules, in particular driver modules, according to the preamble of claim 1.

STATE OF THE ART

It is generally accepted to employ protective diodes for the protection of electronic components against contusion of the poles of the supply voltage. For this purpose either a protective diode is inserted with proper polarity of the supply voltage in forward conducting direction into the feed line of the higher disposed supply potential (+Ub;Vcc) or into the return line of the lower disposed supply potential (−Ub; GND; 0 V). The load currents of all outputs of the component have to take the path to this protective diode in the first case, wherefore a correspondingly large dimensioned and thus expensive protective diode has to be furnished. This disadvantage does not occur in the second case, wherefore this disposition of the protective diode is to be preferred.

In connection with electronic components, in particular driver components, sometimes the case occurs that internal resistances exist between the outputs and the supply connection for the lower disposed potential. This lead to a so-called break or rupture of the neutral conductor, that is an interruption of the supply conductor for the lower disposed supply potential, to a parasitic current flow through the supply connection of the component, the internal resistances and the outputs and finally the loads to the lower disposed supply potential. Thus non-defined and unstable voltage levels, that is undesired voltage levels can occur at the outputs of the component, whereby the safety is not assured in case of a break of the neutral conductor.

PRESENTATION OF THE INVENTION

Therefore it is an object of the present invention to combine an economic protection against reverse polarity with the protection against a rupture or break of the neutral conductor.

Starting from a protective circuit of the initially recited kind, the object is accomplished according to the present invention by the characterizing features of the independent claim, while advantageous further development of the invention can be gathered from the dependent claims.

It is effectively prevented by the arrangement according to the present invention of the known protective diode and a further protective diode, that in case of a rupture of a neutral conductor, currents can form through the internal resistances and the external loads. The component remains on the output side in a defined, that is secure state upon a rupture of the supply line for the lower disposed supply potential independent of the state of the input signals.

Only a single first protective diode is required independent of the number of the components concerned.

The use of the same damping diodes reduces the dependence of the circuit arrangement on forward voltages, forward currents, back blocking voltages, temperature behavior, frequency dependence, and the like in a decisive measure.

SHORT DESCRIPTION OF THE DRAWINGS

Figure 2:
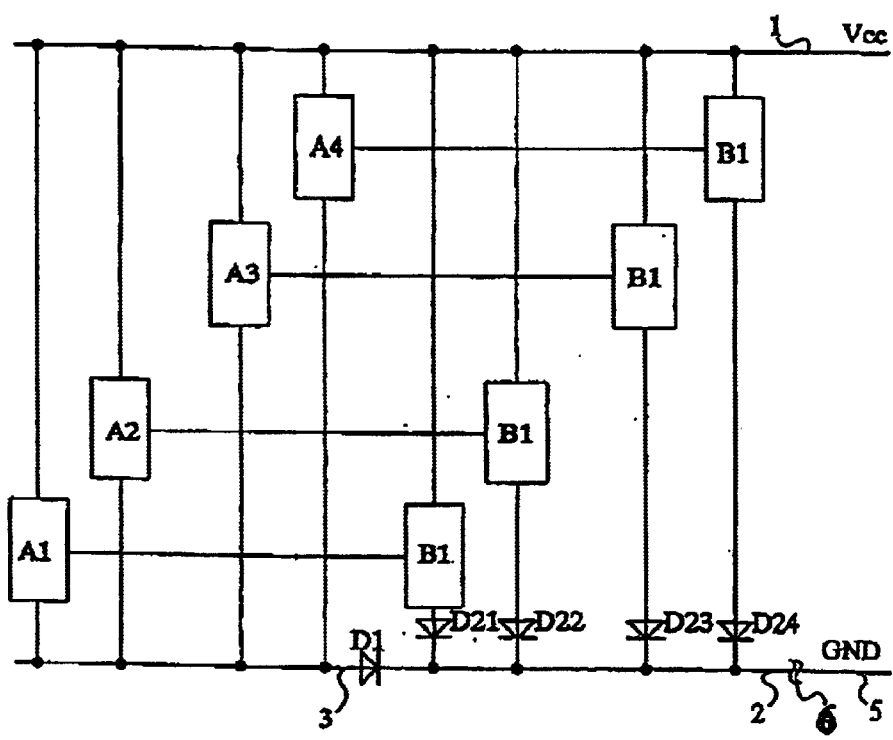

Further details and advantages of the Invention result from the following embodiment illustrated by way of figures. There is shown in:

FIG. 1: a circuit arrangement with a protective circuit according to the present Invention;

FIG. 2: a further circuit arrangement with an advantageous further development of the protective circuit according to the present invention.

The circuit arrangement according to FIG. 1 comprises a driver module B1 with four outputs Q1 through Q4, wherein the load resistors R1 through R4 and the load capacitors C1 through C4 are controlled through the outputs Q1 through Q4. The module B1 is controlled through the inputs I1, I2 through In of the module B1 by predisposed circuit parts formed of a multiple opto-electronic control circuit, as is shown by the example coordinated to the input In. The module B1 and the control circuit A1 are supplied by a supply voltage, wherein the supply voltage is applied between a first feed line 1 for the higher disposed supply potential Vcc and by a second feed line 2 for the lower disposed supply potential GND. A first protective diode D1 is disposed between the second feed line 2 and the third feed line 3 for the control circuit A1 such that the first protective diode D1 is connected to the second feed line 2 through the cathode of the first protective diode D1. A second protective diode D2 is inserted between the supply connection 4 of the module B1 fed by the lower disposed potential GND and the second feed line 2 such that second protective diode D2 is connected to the second feed line 2 through the cathode of the second protective diode D2. In case of a reverse polarity (confusion of polarity) of the supply voltage, the protective diodes D2 and D1 prevent that damaging or, respectively, destroying potentials can pass neither to the supply connection 4 of the module B1 nor to the control circuit A1 through the third feed line 3. The case for the so-called rupture of the neutral connection occurs if an interruption 6 happens, for example by a rupture of the conductor between the second feed line 2 and the general supply line 5 for neutral conductor GND. In this case, the series connection of the oppositely directed protective diodes D1 and D2 prevents that parasitic currents can flow off through the control circuit A1, the supply connection 4, internal resistances Ri1 through Ri4 in the module B1, the outputs Q1 through Q4 and the loads resistances R1 through R4 to the general supply line 5. It is furthermore prevented based on the protective circuit according to the present Invention that oscillations can occur at the outputs Q1 through Q4 based on the dynamic cooperation of the internal resistances Ri1 through Ri4 with the load capacitors C1 through C4.

A circuit arrangement with for example four driver modules B1 through B4 and in each case coordinated control circuits A1 through A4 is shown in a simplified way in FIG. 2. In each case a second protective diode D21 through D24 is coordinated to each module B1 through B4. However, only a single, common first protective diode D1 is required for all control circuits A1 through A4 in the common feed line 3 fed by the lower disposed potential neutral GND. Also, this protective circuit containing the protective diodes D1, D21 through D24 presents an effective protection both against confusion of polarity of the supply voltage as well as against a rupture of the neutral conductor between the second feed line 2 and the general supply line 5.

What is claimed is:

1. Protective circuit for electronic components with a first protective diode disposed in a feed line (2) to a general supply line (5) for a lower disposed supply potential (GND) in case of proper polarity of a supply voltage in forward direction, characterized in that the first protective diode (D1) leading with its cathode to the lower disposed supply potential (GND) is disposed in the feed line (3) for circuit parts (A1) predisposed to a module (B1) and fed by the lower disposed supply potential (GND), and a second protective diode (D2) leading with its cathode to the lower disposed supply potential (GND) is disposed in the supply connection (4) of the module (B1) and fed by the lower disposed supply potential (GND).

2. Protective circuit according to claim 1, wherein the first protective diode (D1) is common and is furnished in a presence of several modules (B1 . . . B4) and in each case a second protective diode (D21 . . . D24) is coordinated to and connected to each module (B1 . . . B4) in the respective supply connection.

3. Protective circuit according to claim 1, characterized in that the first and second diodes (D1; D2) are substantially identical.

4. A protective circuit for electronic driver modules comprising a general supply line for a lower disposed supply potential (GND) in case of proper polarity of a supply voltage in forward direction;

a first feed line (2) connected to the general supply line;

a module (B1);

circuit parts (A1) predisposed to the module (B1);

a second feed line (3) for the circuit parts (A1) predisposed to the module (B1);

a first protective diode (D1) having a first cathode and leading with the first cathode to the lower disposed supply potential (GND) and disposed in the second feed line (3) and fed by the lower disposed supply potential (GND); and a second protective diode (D2) having a second cathode and leading with the second cathode to the lower disposed supply potential (GND) and disposed in the supply connection (4) of the module (B1) and fed by the lower disposed supply potential (GND).

5. The protective circuit according to claim 4 further comprising at least one additional module (B2 . . . B4), wherein the first protective diode (D1) is common and is furnished in a presence of said at least one additional module (B2 . . . B4) and in each case a second protective diode (D1 . . . D24) is coordinated and connected to each module (B1 . . . B4) in the respective supply connection.

6. The protective circuit according to claim 4 further comprising a load capacitor, wherein an output of the module is connected to the lower disposed supply potential (GND) through the load capacitor.

7. The protective circuit according to claim 4 further comprising a load resistor wherein an output of the module is connected to the lower disposed supply potential (GND) through the load resistor.

8. The protective circuit according to claim 4 further comprising a capacitor disposed between a supply potential and the lower disposed supply potential (GND).

9. The protective circuit according to claim 4 further comprising a Zener diode disposed between a supply potential and the lower disposed supply potential (GND).

10. The protective circuit according to claim 4 further comprising an electrical connection between the module (B1) and the circuit parts (A1).

11. The protective circuit according to claim 1 wherein the module is a driver module being protected by the protective circuit.

* * * * *